(12) United States Patent
Fujioka

(10) Patent No.: US 12,083,831 B2
(45) Date of Patent: Sep. 10, 2024

(54) PNEUMATIC TIRE

(71) Applicant: Toyo Tire Corporation, Itami (JP)

(72) Inventor: Tsuyoshi Fujioka, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 229 days.

(21) Appl. No.: 17/668,022

(22) Filed: Feb. 9, 2022

(65) Prior Publication Data

US 2022/0297479 A1    Sep. 22, 2022

(30) Foreign Application Priority Data

Mar. 17, 2021   (JP) ................. 2021-043108

(51) Int. Cl.
*B60C 11/12*      (2006.01)
*B60C 11/03*      (2006.01)

(52) U.S. Cl.
CPC ...... *B60C 11/1236* (2013.01); *B60C 11/0306* (2013.01); *B60C 11/1204* (2013.01); *B60C 11/1259* (2013.01); *B60C 2011/0381* (2013.01); *B60C 2011/0383* (2013.01); *B60C 2011/1213* (2013.01)

(58) Field of Classification Search
CPC ......... B60C 11/0306; B60C 2011/0381; B60C 2011/383
See application file for complete search history.

(56) References Cited

U.S. PATENT DOCUMENTS

2013/0068360 A1   3/2013  Tamugi
2016/0375728 A1*  12/2016 Kuriyama ............... B60C 11/12
                                                  152/209.8
(Continued)

FOREIGN PATENT DOCUMENTS

CN       102991278 A    3/2013
CN       105764709 A    7/2016
(Continued)

OTHER PUBLICATIONS

Office Action dated May 29, 2023, issued in counterpart CN application No. 202111625347.1, with English translation. (19 pages).

(Continued)

*Primary Examiner* — Robert C Dye
(74) *Attorney, Agent, or Firm* — WHDA, LLP

(57) ABSTRACT

A center land has first center notches, second center notches, center slits, a first land end and a second land end. The first center notches and the center slits open onto the first land end in alternating fashion as one proceeds along a tire circumferential direction. The second center notches and the center slits open onto the second land end in alternating fashion as one proceeds along the tire circumferential direction. A quarter land has first quarter slits, first quarter notches, second quarter slits, second quarter notches, a third land end and a fourth land end. The first quarter slits and the first quarter notches open onto the third land end in alternating fashion as one proceeds along the tire circumferential direction. The second quarter slits and the second quarter notches open onto the fourth land end in alternating fashion as one proceeds along the tire circumferential direction.

11 Claims, 5 Drawing Sheets

(56) References Cited

U.S. PATENT DOCUMENTS

2017/0106701 A1* 4/2017 Ito .................... B60C 11/0304
2020/0031171 A1* 1/2020 Fujioka ............. B60C 11/1369
2020/0298627 A1   9/2020 Fujioka

FOREIGN PATENT DOCUMENTS

| CN | 110774835 A | 2/2020 |
| CN | 111703256 A | 9/2020 |
| JP | 2019-108122 A | 7/2019 |

OTHER PUBLICATIONS

Office Action dated Sep. 13, 2023, issued in counterpart Application No. 202111625347.1, with English Translation. (18 pages).

* cited by examiner

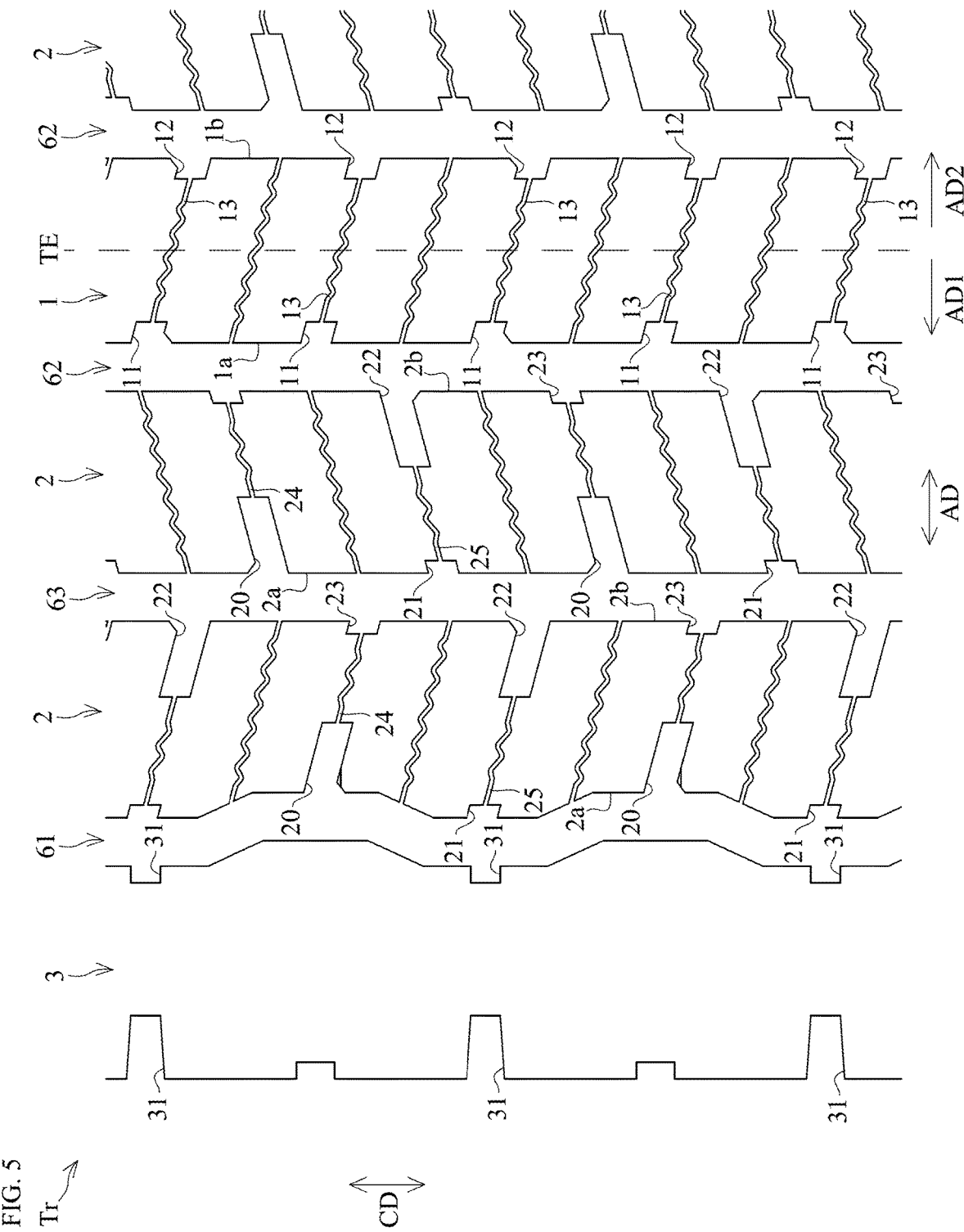

PNEUMATIC TIRE

BACKGROUND OF THE INVENTION

The present disclosure relates to a pneumatic tire.

Simultaneous achievement of performance with respect to resistance to uneven wear and performance with respect to traction is sought for pneumatic tires and particularly for pneumatic tires intended for heavy loads such as those which may be mounted on trucks, buses, and so forth. For example, mention is made of performance with respect to resistance to uneven wear at Japanese Patent Application Publication Kokai No. 2019-108122.

SUMMARY OF THE INVENTION

The present disclosure provides a pneumatic tire permitting simultaneous achievement of performance with respect to traction and performance with respect to resistance to uneven wear.

According of the present disclosure, there is provided a pneumatic tire having a center land which is nearest to a tire equatorial plane, and a shoulder land which is arranged in outwardmost fashion in a tire axial direction, and a quarter land which is arranged between the center land and the shoulder land;
wherein the center land has first center notches which open onto a land end toward a first side in the tire axial direction and which are separated from a land end toward a second side opposite the first side in the tire axial direction, second center notches which are separated from the land end toward the first side and which open onto the land end toward the second side, and center slits which open onto the land ends toward the two sides in the tire axial direction;
wherein the first center notches and the center slits open onto the land end toward the first side of the center land in alternating fashion as one proceeds along a tire circumferential direction, and the second center notches and the center slits open onto the land end toward the second side of the center land in alternating fashion as one proceeds along the tire circumferential direction;
wherein the quarter land has first quarter slits and first quarter notches which open onto a land end toward the first side and which are separated from a land end toward the second side, and second quarter slits and second quarter notches which are separated from the land end toward the first side and which open onto the land end toward the second side; and
wherein the first quarter slits and the first quarter notches open onto the land end toward the first side of the quarter land in alternating fashion as one proceeds along the tire circumferential direction, and the second quarter slits and the second quarter notches open onto the land end toward the second side of the quarter land in alternating fashion as one proceeds along the tire circumferential direction.

BRIEF DESCRIPTION OF THE DRAWINGS

FIG. 5 Partial enlarged view of middle stage of wear at tread surface Tr.

DETAILED DESCRIPTION OF THE PREFERRED EMBODIMENTS

First Embodiment

Below, a first embodiment in accordance with the present disclosure is described with reference to the drawings.

Figure 1:
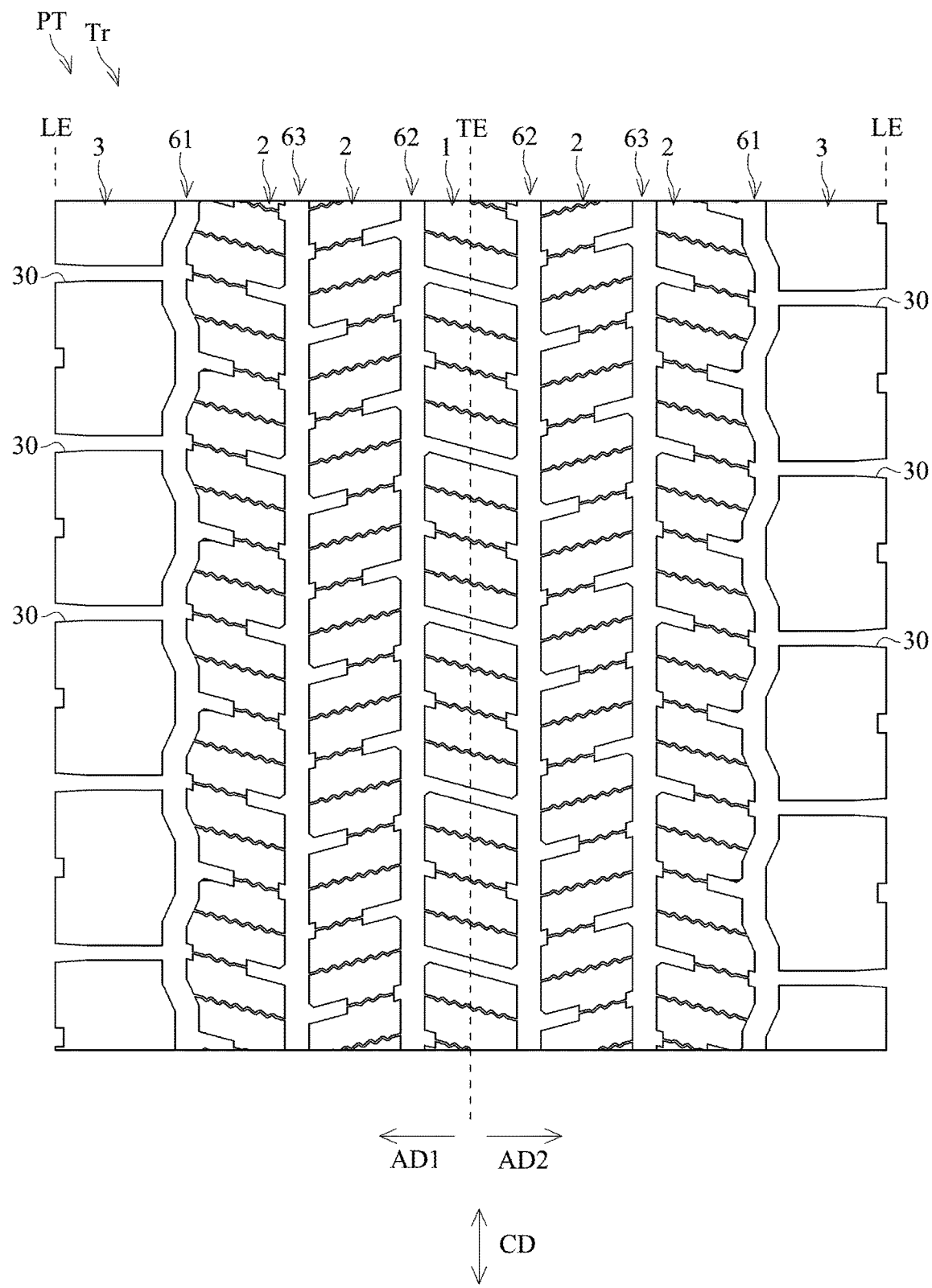
FIG. 1 Drawing showing the tread surface at a pneumatic tire in accordance with a first embodiment as it would exist if the tire when still new was unwrapped so as to lie in a single plane.
Figure 2:
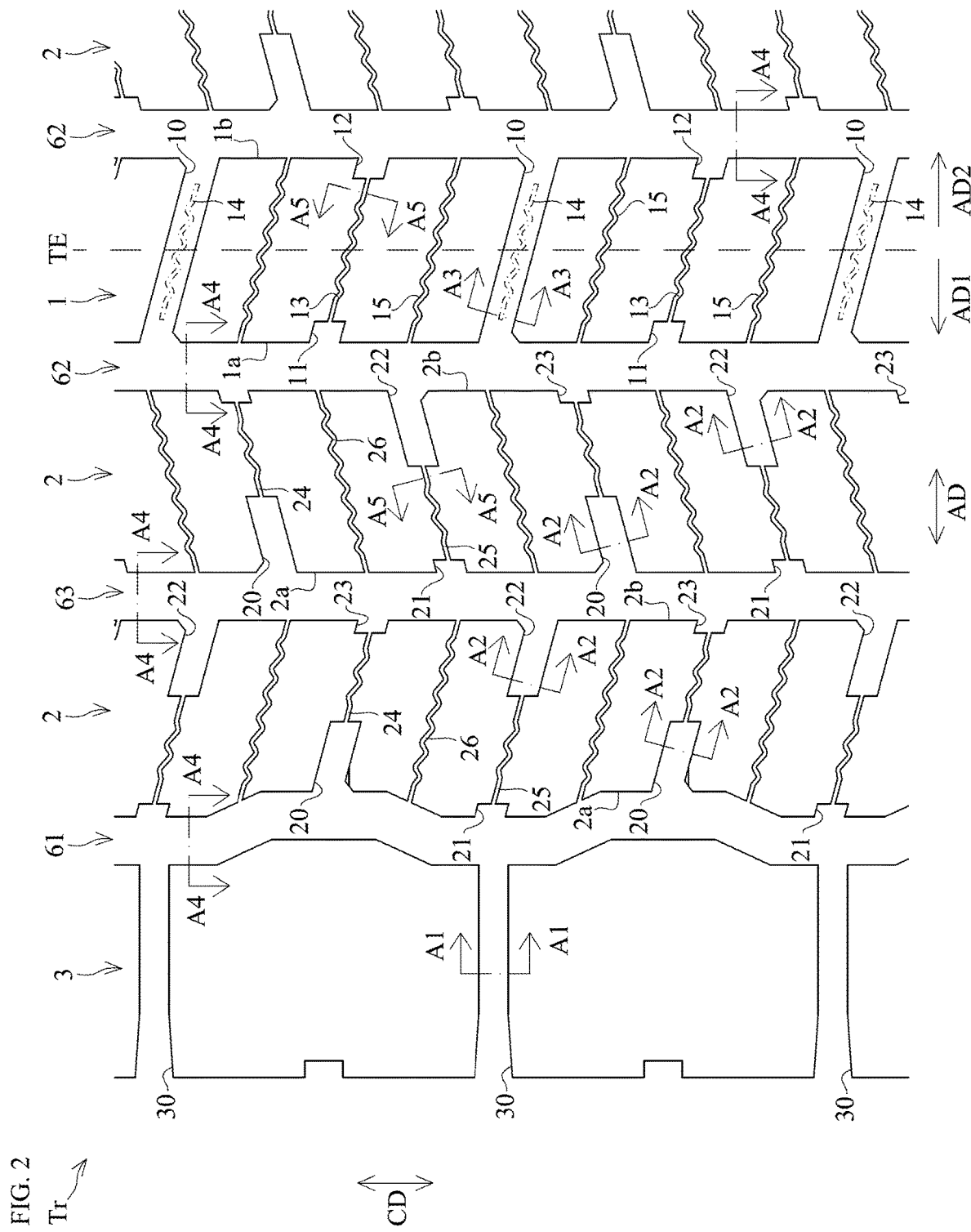
FIG. 2 Partial enlarged view of center land 1, quarter lands 2, and shoulder land 3 shown in FIG. 1.
Figure 3:
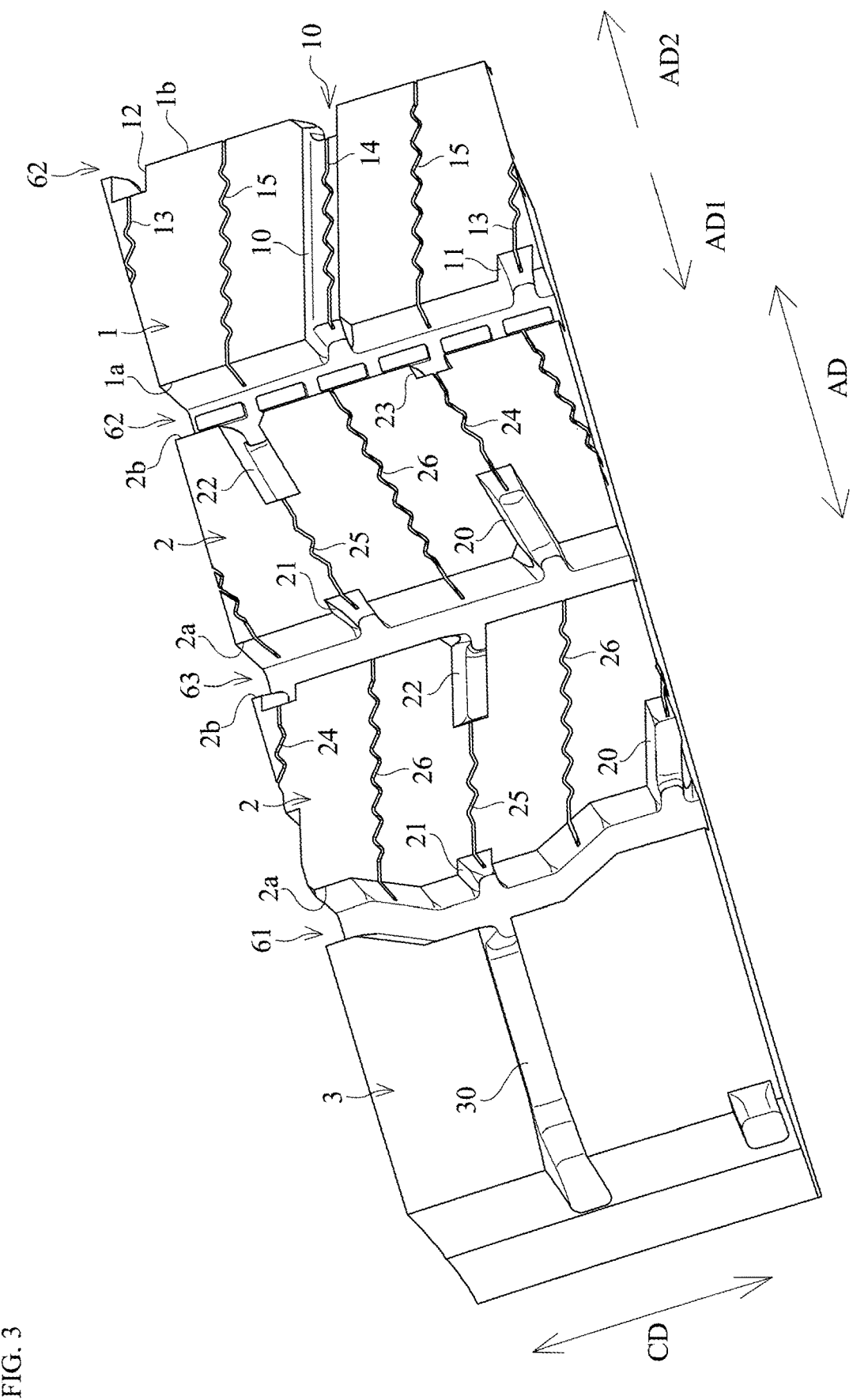
FIG. 3 Partial enlarged perspective view of center land 1, quarter lands 2, and shoulder land 3 shown in FIG. 1.
Figure 4:
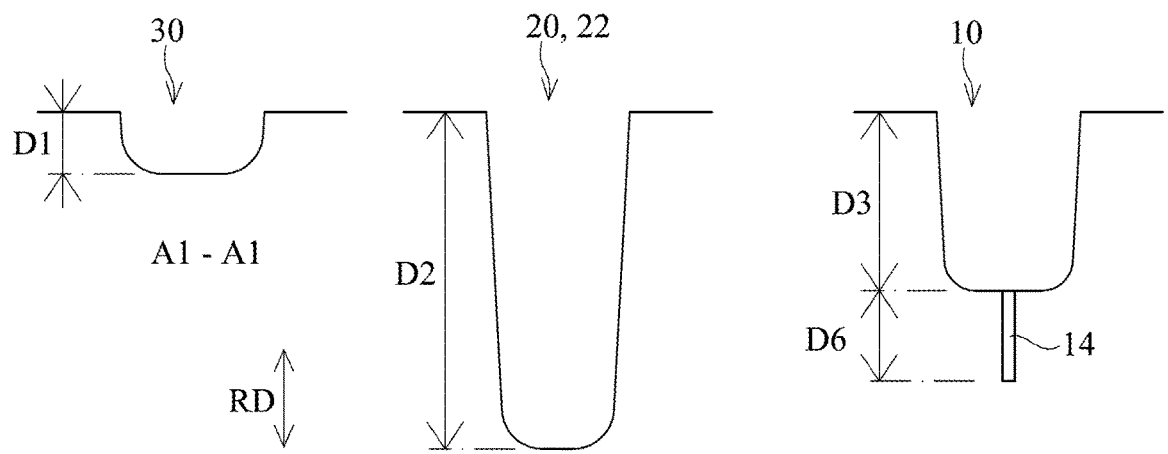
FIG. 4 Sectional views showing region A1-A1, region A2-A2, region A3-A3, region A4-A4, and region A5-A5 in FIG. 2.
Figure 4:
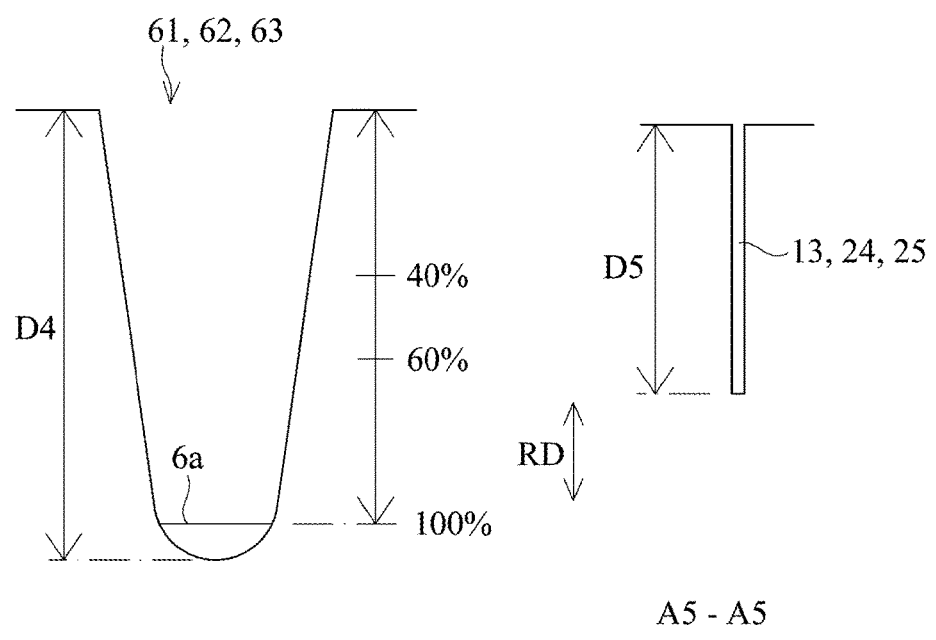

FIG. 1 is a drawing showing tread surface Tr provided at pneumatic tire PT (hereinafter also referred to as simply "tire PT") in accordance with a first embodiment as it would exist if the tire when still new was unwrapped so as to lie in a single plane. FIG. 2 is a partial enlarged view of center land 1, quarter lands 2, and shoulder land 3 shown in FIG. 1. FIG. 3 is a partial enlarged perspective view of center land 1, quarter lands 2, and shoulder land 3 shown in FIG. 1. FIG. 4 is sectional views showing region A1-A1, region A2-A2, region A3-A3, region A4-A4, and region A5-A5 in FIG. 2. FIG. 5 is a partial enlarged view of the middle stage of wear at tread surface Tr. The vertical direction in FIG. 1 through FIG. 3 and in FIG. 5 corresponds to the tire circumferential direction CD, and the horizontal direction in FIG. 1 through FIG. 3 and in FIG. 5 corresponds to the tire axial direction AD. FIGS. 1 through 4 show tread shape as it would exist when the tire is still new. FIG. 5 shows tread shape as it would exist at some point in time during the middle stage of wear. As shown in FIGS. 1 through 3, pneumatic tire PT has a plurality of lands 1, 2, 3 that extend in the tire circumferential direction CD. Tire PT of the first embodiment is a tire intended for heavy loads such as may be mounted on a truck, bus, or the like.

Six major grooves 61, 63, 62, 62, 63, 61 which extend in continuous fashion in the tire circumferential direction CD are disposed at tread surface Tr (where the contact patch comes in contact with the road surface) of tire PT. While in the first embodiment there are six major grooves, there is no limitation with respect thereto. The tire of the first embodiment being a single tire that is capable of being mounted and used in place of two tires, the width thereof in the tire axial direction AD corresponds to the width of two tires. For this reason, the number of major grooves is relatively large, it being possible that the number of major grooves on a single tire might be not less than six but not greater than eight. In accordance with the first embodiment, there are shoulder major grooves 61 which are outwardmost in the tire axial direction AD, two center major grooves 62 which are nearest to tire equatorial plane TE and which are arranged inwardly in the tire axial direction AD from shoulder major grooves 61, and quarter major grooves 63 which are arranged between shoulder major grooves 61 and center major grooves 62. Furthermore, while there is no particular limitation with respect thereto, a constitution may be adopted in which, for example, the major grooves have groove widths not less than 3% of the distance (dimension in the tire axial direction AD) between contact patch ends LE, LE. Furthermore, while there is no particular limitation with respect thereto, a constitution may be adopted in which, for example, the major grooves have groove widths not less than 7.0 mm. Furthermore, while there is no particular limitation with respect thereto, a constitution may be adopted in which, for example, the major grooves have groove depths which—continuously in the tire circumferential direction CD—are deepest within the tread surface Tr. A constitution may be adopted in which TWIs (6a; see FIG. 4) (tread wear indicators) which indicate the usable limit due to wear are disposed at portions within the grooves of the major grooves.

Throughout the present specification, "slit" means a groove which has a width less than that of a major groove but larger than that of a sipe, and for which the length thereof in the tire axial direction is greater than the width thereof in the tire circumferential direction CD. Slits include center slits 10, first quarter slits 20, second quarter slits 22, and shoulder slits 30, which are described below. "Sipe" means a groove having a width not greater than 1.5 mm. Sipes include first center sipes 13, second center sipes 14, and first quarter sipes 24, 25, which are described below. A notch is a groove for which the length thereof in the tire axial direction AD is less than the width thereof in the tire circumferential direction CD. Notches in the first embodiment have depths which are the same as those of major grooves.

Contact patch end LE is the outwardmost end in the tire axial direction AD of tread surface Tr (contact patch). Tread surface Tr (contact patch) refers to the tire surface that contacts the road surface when a tire inflated to normal internal pressure mounted on a normal rim and bearing a normal load is disposed in perpendicular fashion above a flat road surface. A normal rim is that particular rim which is specified for use with a particular tire in the context of the body of standards that contains the standard that applies to the tire in question. This is referred to as a "standard rim" in the case of JATMA, and as a "measuring rim" in the case of TRA or ETRTO.

Normal internal pressure is that air pressure which is specified for use with a particular tire in the context of the body of standards that contains the standard that applies to the tire in question. This is referred to as "maximum air pressure" in the case of JATMA, the maximum value listed in the table entitled "Tire Load Limits at Various Cold Inflation Pressures" in the case of TRA, and as "inflation pressure" in the case of ETRTO.

Normal load is that load which is specified for use with a particular tire in the context of the body of standards that contains the standard that applies to the tire in question. This is referred to as "maximum load capacity" in the case of JATMA, the maximum value listed in the aforementioned table in the case of TRA, and as "load capacity" in the case of ETRTO.

Center Land 1

As shown in FIGS. 1 through 3, pneumatic tire PT has at least one center land 1 between the pair of shoulder major grooves 61, 61. Center land 1 extends in the tire circumferential direction CD. Center land 1 is that land which is nearest to tire equatorial plane TE. While, in the first embodiment, tire equatorial plane TE passes through center land 1, and center land 1 is partitioned by the pair of center major grooves 62, there is no limitation with respect thereto. Center land 1 has first center notch(es) 11, second center notch(es) 12, and center slit(s) 10.

First center notch 11 opens onto land end 1a toward first side AD1 (toward the left in the drawing) in the tire axial direction AD, and terminates within the land at a location separated from land end 1b toward second side AD2 (toward the right in the drawing) which is opposite first side AD1 in the tire axial direction AD. Second center notch 12 terminates within the land at a location separated from land end 1a toward first side AD1, and opens onto land end 1b toward second side AD2. Center slit 10 opens onto land ends 1a, 1b toward either side in the tire axial direction AD. Presence of center slits 10 causes the tread surface of center land 1 as it exists when the tire is new to be divided into a plurality of blocks in the tire circumferential direction CD. As a result, presence of center slits 10 at center land 1, at which contact patch pressure is high, makes it possible to appropriately achieve performance with respect to traction.

First center notches 11 and center slits 10 open onto land end 1a toward first side AD1 of center land 1 in alternating fashion as one proceeds along the tire circumferential direction CD. Second center notches 12 and center slits 10 open onto land end 1b toward second side AD2 of center land 1 in alternating fashion as one proceeds along the tire circumferential direction CD. This improves balance with respect to rigidity at center land 1 and makes it possible to ensure performance in terms of wear resistance. Furthermore, by causing not only center slits 10 but also first center notches 11 and second center notches 12 to be arranged thereat, this will make it possible to suppress marked deterioration in performance with respect to resistance to uneven wear without causing blocks to be made excessively small.

Center slits 10, first center notches 11, and second center notches 12 may be formed so as to appear straight and without curved portions as seen in plan view (as viewed along a line of sight in the tire radial direction RD). Center slits 10 and first center notches 11 are inclined with respect to the tire axial direction AD. The direction in which center slits 10 are inclined and the direction in which first center notches 11 are inclined are the same direction. Center slits 10 and second center notches 12 are inclined with respect to the tire axial direction AD. The direction in which center slits 10 are inclined and the direction in which second center notches 12 are inclined are the same direction.

Quarter Lands 2

As shown in FIGS. 1 through 3, in accordance with the first embodiment, two quarter lands 2 are arranged between shoulder land 3 and center land 1. Two quarter lands 2 are arranged to one side in the tire axial direction AD, and two quarter lands 2 are arranged to the other side in the tire axial direction AD. That is, a plurality of (two) pairs of quarter lands 2 straddle center land 1. Quarter land 2 has first quarter slit(s) 20, first quarter notch(es) 21, second quarter slit(s) 22, and second quarter notch(es) 23.

First quarter slit 20 and first quarter notch 21 open onto land end 2a toward first side AD1, and terminate within the land at locations separated from land end 2b toward second side AD2. Second quarter slit 22 and second quarter notch 23 terminate within the land at locations separated from land end 2a toward first side AD1, and open onto land end 2b toward second side AD2. First quarter slit 20 and second quarter notch 23 mutually correspond and are mutually connected by first quarter sipe 24, described below. First quarter notch 21 and second quarter slit 22 mutually correspond and are mutually connected by second quarter sipe 25, described below. First quarter slits 20 and first quarter notches 21 open onto land end 2a toward first side AD1 of quarter land 2 in alternating fashion as one proceeds along the tire circumferential direction CD. Second quarter slits 22 and second quarter notches 23 open onto land end 2b toward second side AD2 of quarter land 2 in alternating fashion as one proceeds along the tire circumferential direction CD. As a result, because slits and notches are arranged in alternating fashion as one proceeds along the tire circumferential direction CD of quarter land 2 but none of the slits which are provided thereat cause quarter land 2 to be divided into blocks, it is possible to simultaneously ensure both performance with respect to resistance to uneven wear and performance with respect to traction due to slits and notches.

First quarter slits 20, first quarter notches 21, second quarter slits 22, and second quarter notches 23 may be formed so as to appear straight as seen in plan view (as viewed along a line of sight in the tire radial direction RD). First quarter slits 20, first quarter notches 21, second quarter slits 22, and second quarter notches 23 are inclined with respect to the tire axial direction AD.

Quarter slits (first quarter slits 20 and second quarter slits 22) and quarter notches (first quarter notches 21 and second quarter notch 23) at the same land are inclined in the same direction. On the other hand, the direction in which slits and notches of a first quarter land are inclined and the direction in which slits and notches of a second quarter land, which is adjacent to the first quarter land, are inclined are mutually opposite directions.

Furthermore, the direction in which slits and notches of center land 1 are inclined and the direction in which slits and notches of quarter lands 2, which are adjacent to center land 1, are inclined are mutually opposite directions.

In this way, because slits and notches of adjacent lands are in mutually opposite directions, when the overall pattern is considered, it will be seen that improvement in performance with respect to wear resistance is made possible.

Shoulder Lands 3

As shown in FIGS. 1 through 3, pneumatic tire PT has shoulder lands 3 that extend in the tire circumferential direction CD at either end in the tire axial direction AD of tread surface Tr. Shoulder land 3 is partitioned by shoulder major groove 61 and contact patch end LE. Shoulder land 3 has shoulder slits 30 that extend in the tire axial direction AD. Shoulder slit 30 opens onto the land ends toward either side in the tire axial direction AD, and opens into shoulder major groove 61 and into contact patch end LE. Presence of shoulder slits 30 causes tread surface Tr of shoulder land 3 as it exists when the tire is new to be partitioned into a plurality of blocks which are arrayed in the tire circumferential direction CD. Shoulder lands 3 do not have sipes. Because shoulder lands 3, at which uneven wear tends to occur, do not have sipes, this makes it possible to improve performance with respect to resistance to uneven wear.

Slit Depth

While depths in the tire radial direction RD of first quarter slits 20 and second quarter slit 22 are identical in accordance with the first embodiment as shown in FIG. 2 and FIG. 4, there is no limitation with respect thereto. "Depth" means depth in the tire radial direction RD, the expression "in the tire radial direction RD" sometimes being omitted hereinafter. Depth D3 of center slit 10 at center land 1 is less than depth D2 of second quarter slit 22 and first quarter slit 20 at quarter land 2. Center slit 10 is less deep than quarter slits 20, 22. As a result, movement of center land 1 is better able to be suppressed, and performance with respect to resistance to uneven wear is better able to be improved, than would be the case were depths D3 and D2 the same. It is preferred that depth D3 of center slit 10 at center land 1 be not less than 40% but not greater than 90% of depth D2 of second quarter slit 22 and first quarter slit 20. This is so as to permit improvement in performance with respect to resistance to uneven wear at center land 1.

Depth D3 of center slit 10 at center land 1 is less than depth D4 of major grooves 61, 62, 63.

Depth D2 of second quarter slit 22 and first quarter slit 20 is less than depth D4 of major grooves 61, 62, 63.

Depth D1 of shoulder slit 30 at shoulder land 3 is less than depth D3 of center slit 10 at center land 1. Shoulder slit 30 is less deep than center slit 10. This makes it possible to improve performance with respect to resistance to uneven wear at shoulder land 3. It is preferred that depth D1 in the tire radial direction RD of shoulder slit 30 be not less than 10% but not greater than 50% of depth D3 in the tire radial direction RD of center slit 10.

Depth D1 of shoulder slit 30 is less than depth D4 of major grooves 61, 62, 63.

Notch Depth

While depths of first center notches 11, second center notches 12, first quarter notches 21, and second quarter notches 23 are the same as depth D4 of major grooves 61, 62, 63, there is no limitation with respect thereto. Depths of respective notches 11, 12, 21, 23 may be less than depth D4 of the major grooves.

Sipes

As shown in FIGS. 1 through 4, center land 1 may have first center sipes 13. First center sipe 13 extends in the tire axial direction AD and opens into both first center notch 11 and second center notch 12. First center sipe 13 is of wavelike shape where tread surface Tr comes in contact with the road surface. As a result, because movement of center land 1 is better able to be suppressed, performance with respect to resistance to uneven wear is better able to be improved than would be the case were the shape thereof at tread surface Tr that of a straight sipe.

As shown in FIGS. 1 through 4, center land 1 may have second center sipes 14. Second center sipe 14 divides the bottom of center slit 10 in the tire circumferential direction CD. It is preferred, as is the case in the first embodiment, that second center sipe 14 be formed centrally in the tire circumferential direction CD at the bottom of center slit 10. Second center sipe 14 is open to major grooves 62, 62 toward either side in the tire axial direction AD. Second center sipe 14 is of wavelike shape when tread surface Tr is in the middle stage of wear. As a result, performance with respect to resistance to uneven wear at center land 1 when the tire is still new will be better able to be improved than would be the case were the constitution such that depths of center slits 10 are large. Furthermore, because second center sipes 14 will appear at tread surface Tr during the middle stage of wear, this will make it possible to improve performance with respect to traction during the middle stage of wear.

Furthermore, center land 1 is such that at either respective land end 1a, 1b to either side thereof in the tire axial direction AD, center slits 10 and center notches (11, 12) are arranged in alternating fashion as one proceeds along the tire circumferential direction CD; and moreover, first center sipes 13 and second center sipes 14 will appear in mutually alternating fashion as one proceeds along the tire circumferential direction CD. This will make it possible to simultaneously ensure attainment of land rigidity as well as traction elements, and will make it possible to simultaneously achieve both improvement in performance with respect to resistance to uneven wear and performance with respect to traction in well-balanced fashion.

As shown in FIG. 4, taking the percent wear at major groove TWI (6a) to be defined as being at 100% when this reaches tread surface Tr, "middle stage of wear" may mean when percent wear is not less than 40% but is not greater than 60%. Alternatively, it may be taken to mean any point in time during the period when the tire has worn to the extent that depth from the tread surface to the apex of the TWI has come to be not less than 40% but not greater than 60% of what it was when the tire was new.

Where center slit 10 is such that it vanishes at some point in time when percent wear is not less than 40% but not greater than 60%, this may be taken to indicate that depth D3 of center slit 10 is greater than the depth at which wear progressed to the point where percent wear reached 40%.

Combined depth (D3+D6) of center slit 10 and second center sipe 14 may be identical to depth D5 of first center sipe 13.

Combined depth (D3+D6) of center slit 10 and second center sipe 14 may be greater than the depth at which wear has progressed to the point where percent wear reaches 60%.

Depth D5 of first center sipe 13 may be greater than depth D3 of center slit 10. Depth D5 of first center sipe 13 may be greater than the depth at which wear has progressed to the point where percent wear reaches 60%.

First center sipes 13 and second center sipes 14 are inclined with respect to the tire axial direction AD, the directions in which these are inclined being the same as that of center slit 10. The directions in which center sipes (13, 14) are inclined may be such that the centerline of the amplitude of the wavelike portion thereof is inclined with respect to the tire axial direction AD.

Center land 1 may have third center sipe 15 at a location intermediate between first center sipe 13 and center slit 10. Third center sipe 15—like first center sipe 13—is a sipe which is of wavelike shape, and opens onto land ends 1a, 1b toward either side in the tire axial direction AD of center land 1. The direction in which third center sipe 15 is inclined with respect to the tire axial direction AD is the same as the direction in which center slit 10 is inclined with respect thereto.

As shown in FIGS. 1 through 4, quarter land 2 may have first quarter sipes 24 and second quarter sipes 25. First quarter sipe 24 extends in the tire axial direction AD and opens into both first quarter slit 20 and second quarter notch 23. Second quarter sipe 25 extends in the tire axial direction AD and opens into both first quarter notch 21 and second quarter slit 22. Presence of first quarter sipes 24 and second quarter sipes 25 makes it possible to suppress reduction in land rigidity at quarter land 2 and makes it possible to improve performance with respect to resistance to uneven wear. While depth D5 of first quarter sipe 24 and second quarter sipe 25 are identical to depth D5 of first center sipe 13, there is no limitation with respect thereto.

Quarter land 2 may have third quarter sipe 26 at a location intermediate between first quarter sipe 24 and second quarter sipe 25. Third quarter sipe 26— like first quarter sipe 24—is a sipe which is of wavelike shape, and opens onto land ends 2a, 2b toward either side in the tire axial direction AD of quarter land 2. The direction in which third quarter sipe 26 is inclined with respect to the tire axial direction AD is the same as the direction in which notches (21, 23) and slits (20, 22) of the same quarter land 2 are inclined with respect thereto.

Dimensions in Tire Axial Direction of Various Elements

It is preferred that that the dimension in the tire axial direction AD of any one notch be not less than 5% but not greater than 15% of the dimension in the tire axial direction of the respective land. This is so as to ensure land rigidity and ensure performance with respect to resistance to uneven wear. More specifically, the dimension in the tire axial direction AD of first center notch 11 or second center notch 12 might be not less than 5% but not greater than 15% of the dimension in the tire axial direction of center land 1. The dimension in the tire axial direction AD of first quarter notch 21 or second quarter notch 23 might be not less than 5% but not greater than 15% of the dimension in the tire axial direction of quarter land 2.

Length in the tire axial direction AD of first center sipe 13 may be greater than the combined length in the tire axial direction AD of first center notch 11 and second center notch 12. This will make it possible to ensure land rigidity at center land 1 which tends to move due to the fact that it is in the shape of blocks and permit improvement in performance with respect to resistance to uneven wear, and will also make it possible to attain performance with respect to traction.

It is preferred that length in the tire axial direction AD of first center sipe 13 be not less than 70% but not greater than 90% of length in the tire axial direction AD of center land 1. Furthermore, to the extent permitted by this numeric range, it is preferred that length in the tire axial direction AD of first center sipe 13 be not less than 2.0 times but not greater than 9.0 times the combined length in the tire axial direction AD of first center notch 11 and second center notch 12. This will make it possible to ensure performance with respect to traction while making it possible to ensure land rigidity at center land 1 and improve performance with respect to resistance to uneven wear.

Length in the tire axial direction AD of quarter sipe (24, 25) may be approximately the same as the combined length in the tire axial direction AD of quarter notch (23, 21) and quarter slit (20, 22) at quarter lands 2. This will ensure land rigidity at quarter lands 2 and improve performance with respect to resistance to uneven wear, and will also make it possible to ensure performance with respect to traction.

The length in the tire axial direction AD of first quarter sipe 24 or second quarter sipe 25 might be not less than 40% but not greater than 60% of the land width in the tire axial direction AD of quarter land 2. Furthermore, to the extent permitted by this numeric range, length in the tire axial direction AD of quarter sipe (24, 25) might be not less than 0.8 times but not greater than 1.2 times the combined length in the tire axial direction AD of quarter notch (23, 21) and quarter slit (20, 22) at quarter lands 2.

As shown in FIG. 2, openings of notches (first center notches 11 and second center notches 12) at center land 1, and openings of slits and notches at that quarter land 2 which is adjacent to center land 1, are at different locations in the tire circumferential direction CD direction, such that these do not face one another across the intervening major groove. As a result, because the notches of center land 1 and the slits and notches of quarter land 2 will appear in alternating fashion at the contact patch, this will facilitate production of traction.

Comparison of Tire when New Versus when in the Middle Stage of Wear

As shown in FIG. 2, center land 1 as it exists when the tire is still new is in the shape of a plurality of blocks partitioned in the tire circumferential direction CD by center slits 10. During the middle stage of wear, center slits 10 disappear such that center land 1 changes into a rib-like shape which is continuous in the tire circumferential direction CD. What were center slits 10 when the tire was new become first center notches 11 and second center notches 12 during the middle stage of wear. What were second center sipes 14 when the tire was new become first center sipes 13 during the middle stage of wear. As a result, the constitution of center land 1 when the tire is still new emphasizes performance with respect to traction more than performance with respect to resistance to wear, and the constitution thereof during the middle stage of wear emphasizes performance with respect to resistance to uneven wear more than performance with respect to traction.

As shown in FIG. 5, the pattern at quarter lands 2 does not change. Quarter lands 2 are constituted such that performance with respect to traction and performance with respect to resistance to uneven wear are well-balanced both when the tire is still new and during the middle stage of wear.

On the other hand, shoulder land 3 as it exists when the tire is new is in the shape of a plurality of blocks partitioned in the tire circumferential direction CD by shoulder slits 30. During the middle stage of wear at shoulder land 3, shoulder slits 30 disappear and become grooves 31, one end of which opens into contact patch end LE or shoulder major groove 61, and the other end of which terminates within the land. This makes it possible to improve balance with respect to wear of the overall tread surface which includes center land 1, quarter lands 2, and shoulder lands 3, and makes it possible to increase the life of the tire.

Variations (1) While in the first embodiment there are six major grooves, there is no limitation with respect thereto. For example, at a pneumatic tire PT having a single center major groove which passes through tire equatorial plane TE, a pair of center lands may be respectively arranged to either side in the tire axial direction of the single center major groove. For example, where there are seven major grooves, center major groove 62 might be arranged at tire equatorial plane TE, and a pair of center lands 1 might be arranged to either side in the tire axial direction AD of center major groove 62. Two pairs of quarter lands 2 might be respectively arranged toward the exterior in the tire axial direction AD from the respective center lands 1.

(2) Whereas in the first embodiment a plurality of (two) pairs of quarter lands 2 straddle center land 1, a single pair of quarter lands 2 may straddle center land 1.

(3) Whereas in the first embodiment the sipes are non-three-dimensional sipes that do not change in shape in correspondence to change in depth thereof, these may be three-dimensional sipes that do change in shape in correspondence to change in depth thereof.

As described above, as in the first embodiment shown in FIGS. 1 to 5, the pneumatic tire may have a center land 1 which is nearest to a tire equatorial plane TE, and a shoulder land 3 which is arranged in outwardmost fashion in a tire axial direction AD, and a quarter land 2 which is arranged between the center land 1 and the shoulder land 3; wherein the center land 1 has first center notches 11 which open onto a land end 1a toward a first side AD1 in the tire axial direction AD and which are separated from a land end 1b toward a second side AD2 opposite the first side AD1 in the tire axial direction AD, second center notches 12 which are separated from the land end 1a toward the first side AD1 and which open onto the land end 1b toward the second side AD2, and center slits 10 which open onto the land ends 1a, 1b toward the two sides AD1, AD2 in the tire axial direction AD; wherein the first center notches 11 and the center slits 10 open onto the land end 1a toward the first side AD1 of the center land 1 in alternating fashion as one proceeds along a tire circumferential direction CD, and the second center notches 12 and the center slits 10 open onto the land end 1b toward the second side AD2 of the center land 1 in alternating fashion as one proceeds along the tire circumferential direction CD; wherein the quarter land 2 has first quarter slits 20 and first quarter notches 21 which open onto a land end 2a toward the first side AD1 and which are separated from a land end 2b toward the second side AD2, and second quarter slits 22 and second quarter notches 23 which are separated from the land end 2a toward the first side AD1 and which open onto the land end 2b toward the second side AD2; and wherein the first quarter slits 20 and the first quarter notches 21 open onto the land end 2a toward the first side AD1 of the quarter land 2 in alternating fashion as one proceeds along the tire circumferential direction CD, and the second quarter slits 22 and the second quarter notches 23 open onto the land end 2b toward the second side AD2 of the quarter land 2 in alternating fashion as one proceeds along the tire circumferential direction CD.

As a result of adoption of such constitution, because notches (11, 12, 21, 23) and slits (10, 20, 22) at center land(s) 1 and quarter land(s) 2 respectively open onto respective land ends 1a, 1b, 2a, 2b in alternating fashion as one proceeds along the tire circumferential direction CD, it will be possible to achieve balance in the rigidity of the respective lands at center land(s) 1 and quarter land(s) 2, and it will be possible to improve performance with respect to resistance to uneven wear.

Because contact patch pressure is higher at center land(s) 1 than at other land(s), causing center land(s) 1 to be divided by center slits 10 into a plurality of blocks in the tire circumferential direction CD causes these to be imparted with the role of effectively ensuring traction. In contradistinction thereto, at quarter land(s) 2, the fact that slits (20, 22) and notches (21, 23) are arranged in alternating fashion as one proceeds along the tire circumferential direction thereof but none of the slits which are provided thereat cause quarter land(s) 2 to be divided into blocks makes it possible to simultaneously ensure both performance with respect to resistance to uneven wear and performance with respect to traction due to slits and notches. Furthermore, if the pitch of quarter land(s) 2 and the pitch of center land(s) 1 are made to agree, and only center slits 10 are arranged at center land(s) 1, this will cause blocks to become small and will cause performance with respect to resistance to uneven wear to deteriorate. By therefore causing notches (11, 12) and center slits 10 to be arranged at center land(s) 1 in alternating fashion as one proceeds along the tire circumferential direction CD, marked deterioration in performance with respect to resistance to uneven wear that might otherwise occur is suppressed.

Accordingly, it is possible to simultaneously ensure traction and performance with respect to resistance to uneven wear.

As shown in FIGS. 1 through 5, depths of center slits 10 at center land(s) 1 may, as is the case in the present embodiment, be less than those of both first quarter slits 20 and second quarter slits 22 at quarter land(s) 2.

If depths of center slits 10 and quarter slits (20, 22) were the same, this would cause movement of center land(s) 1 which is/are divided by center slits 10 to be greater than that at quarter land(s) 2, which could lead to uneven wear. In contradistinction thereto, causing depths of center slits 10 to be less than those of quarter slits (20, 22) makes it possible to suppress movement of blocks at center land(s) 1 and makes it possible to improve performance with respect to resistance to uneven wear.

As in the first embodiment shown in FIGS. 1 to 5, the shoulder land may have shoulder slits 30 which open onto land ends toward the two sides in the tire axial direction AD, and depths of the shoulder slits 30 are less than the depths of the center slits 10.

As a result of adoption of such constitution, because lateral forces tend to act more at shoulder lands 3 than at other lands, there is a tendency for uneven wear to occur thereat. By therefore causing depths of shoulder slits 30 to be less than those of other slits (10, 20, 22), this will make it possible to improve performance with respect to resistance to uneven wear.

As in the first embodiment shown in FIGS. 1 to 5, the center slits 10, the first quarter slits 20, and the second quarter slits 22 may be respectively inclined with respect to the tire axial direction AD; and a direction in which the center slits 10 are inclined is opposite a direction in which the second quarter slits 22 and the first quarter slits 20 at the quarter land which is adjacent to the center land are inclined.

As a result of adoption of such constitution, because when the overall pattern is considered it will be seen that weaknesses at some land(s) are compensated for by other land(s), this makes it possible to improve performance with respect to resistance to uneven wear.

As in the first embodiment shown in FIGS. 1 to 5, the center land 1 may have first center sipes 13 that open into both the first center notches 11 and the second center notches 12; and the quarter land 2 may have first quarter sipes 24 that open into both the first quarter slits 20 and the second quarter notches 23, and second quarter sipes 25 that open into both the first quarter notches 21 and the second quarter slits 22.

As a result of adoption of such constitution, reduction in land rigidity at center land(s) 1 that might otherwise occur is suppressed by first center sipes 13, improving performance with respect to resistance to uneven wear, and first center sipes 13 also make it possible to improve traction. Similarly, reduction in land rigidity at quarter land(s) 2 that might otherwise occur is suppressed by quarter sipes (24, 25), improving performance with respect to resistance to uneven wear, and quarter sipes (24, 25) also make it possible to improve traction.

As in the first embodiment shown in FIGS. 1 to 5, the center land 1 may have second center sipes 14 that divide bottoms of the center slits 10 in the tire circumferential direction CD.

As a result of adoption of such constitution, it will be possible to suppress uneven wear that might otherwise occur when the tire is still new and during the initial stage of wear. Because second center sipes 14 appear at the surface during the middle stage of wear, this makes it possible to improve traction during the middle stage of wear.

As in the first embodiment shown in FIGS. 1 to 5, the first center sipes 13 and the second center sipes 14 may be arranged in alternating fashion as one proceeds along the tire circumferential direction CD.

As a result of adoption of such constitution, it will be possible for improvement in performance with respect to resistance to uneven wear and improvement in traction to be simultaneously achieved in well-balanced fashion.

As in the first embodiment shown in FIGS. 1 to 5, the center land 1 as it exists when the tire is new is in a shape of a plurality of blocks partitioned in the tire circumferential direction CD by the center slits 10, but during a middle stage of wear the center slits 10 may disappear such that the center land 1 may become a rib-like shape which is continuous in the tire circumferential direction CD; and what were the center slits 10 when the tire was new may become the first center notches 11 and the second center notches 12 during the middle stage of wear, and what were the second center sipes 14 when the tire was new may become the first center sipes 13 during the middle stage of wear.

As a result of adoption of such constitution, center land(s) 1 is/are in the shape of blocks, the constitution being such as to emphasize performance with respect to traction due to center slits 10, when the tire is still new and during the initial stage of wear. But because this has the unintended consequence of causing wear to be accelerated, center land(s) 1 will be relatively prone toward wear. In addition, during the middle stage of wear, center slits 10 disappear, the constitution (first center notches 11, second center notches 12, first center sipes 13) becoming such that performance with respect to resistance to uneven wear is emphasized more than performance with respect to traction. Accordingly, it being possible to improve balance with respect to wear of the overall tire during the middle stage of wear, it will be possible to increase the life of the tire.

As in the first embodiment shown in FIGS. 1 to 5, the first center sipes 13, the second center sipes 14, the first quarter sipes 24, and the second quarter sipes 25 may be respectively of wavelike shape at a tread surface Tr.

As a result of adoption of such constitution, because it is possible to suppress movement of land(s) by sipes of wavelike shape, this makes it possible to improve performance with respect to resistance to uneven wear.

As in the first embodiment shown in FIGS. 1 to 5, no sipe is present at the shoulder land 3. Shoulder lands 3 tend to wear unevenly.

As a result of adoption of such constitution, because sipes are not provided at shoulder lands 3, this makes it possible to ensure land rigidity at shoulder lands 3 and makes it possible to improve performance with respect to resistance to uneven wear.

While embodiments in accordance with the present disclosure have been described above with reference to the drawings, it should be understood that the specific constitution thereof is not limited to these embodiments. The scope of the present disclosure is as indicated by the claims and not merely as described at the foregoing embodiments, and moreover includes all variations within the scope of or equivalent in meaning to that which is recited in the claims.

Structure employed at any of the foregoing embodiment(s) may be employed as desired at any other embodiment(s). The specific constitution of the various components is not limited only to the foregoing embodiment(s) but admits of any number of variations without departing from the gist of the present disclosure.

Structure employed at any of the foregoing embodiment(s) may be employed as desired at any other embodiment(s).

The invention claimed is:

1. A pneumatic tire provided with a center land which is nearest to a tire equatorial plane, and a shoulder land which is arranged in outward most fashion in a tire axial direction, and a quarter land which is arranged between the center land and the shoulder land, and a plurality of main grooves partitioning the center land and the shoulder land, and extending in the tire circumferential direction;
   wherein the center land has first center notches which open onto a land end toward a first side in the tire axial direction and which are separated from a land end toward a second side opposite the first side in the tire axial direction, second center notches which are separated from the land end toward the first side and which open onto the land end toward the second side, and center slits which open onto the land ends toward the two sides in the tire axial direction;
   wherein the first center notches and the center slits open onto the land end toward the first side of the center land in alternating fashion as one proceeds along a tire circumferential direction, and the second center notches and the center slits open onto the land end toward the second side of the center land in alternating fashion as one proceeds along the tire circumferential direction;

wherein the quarter land has first quarter slits and first quarter notches which open onto a land end toward the first side and which are separated from a land end toward the second side, and second quarter slits and second quarter notches which are separated from the land end toward the first side and which open onto the land end toward the second side;

wherein the first quarter slits and the first quarter notches open onto the land end toward the first side of the quarter land in alternating fashion as one proceeds along the tire circumferential direction, and the second quarter slits and the second quarter notches open onto the land end toward the second side of the quarter land in alternating fashion as one proceeds along the tire circumferential direction, wherein the land ends of the center land extend only parallel to each other in tire circumferential direction, wherein the first center notch has the same depth as a main groove that forms the land end of the center land toward the first side in the tire axial direction among the plurality of main grooves, and wherein the second center notch has the same depth as a main groove that forms the land end of the center land toward the second side in the tire axial direction among the plurality of main grooves.

2. The pneumatic tire according to claim 1 wherein depths of the center slits at the center land are less than all depths of the second quarter slits and the first quarter slits at the quarter land.

3. The pneumatic tire according to claim 2 wherein the shoulder land has shoulder slits which open onto land ends toward the two sides in the tire axial direction, and depths of the shoulder slits are less than the depths of the center slits.

4. The pneumatic tire according to claim 1 wherein the center slits, the first quarter slits, and the second quarter slits are respectively inclined with respect to the tire axial direction; and a direction in which the center slits are inclined is opposite a direction in which the second quarter slits and the first quarter slits at the quarter land which is adjacent to the center land are inclined.

5. The pneumatic tire according to claim 1 wherein
the center land has first center sipes that open into both the first center notches and the second center notches; and
the quarter land has first quarter sipes that open into both the first quarter slits and the second quarter notches, and second quarter sipes that open into both the first quarter notches and the second quarter slits.

6. The pneumatic tire according to claim 5 wherein the center land has second center sipes that divide bottoms of the center slits in the tire circumferential direction.

7. The pneumatic tire according to claim 6 wherein the first center sipes and the second center sipes are arranged in alternating fashion as one proceeds along the tire circumferential direction.

8. The pneumatic tire according to claim 6 wherein
the center land as it exists when the tire is new is in a shape of a plurality of blocks partitioned in the tire circumferential direction by the center slits, but during a middle stage of wear the center slits disappear such that the center land becomes a rib-like shape which is continuous in the tire circumferential direction; and
what were the center slits when the tire was new become first center notches and second center notches during the middle stage of wear, and what were second center sipes when the tire was new become the first center sipes during the middle stage of wear.

9. The pneumatic tire according to claim 6 wherein the first center sipes, the second center sipes, the first quarter sipes, and the second quarter sipes are respectively of wavelike shape at a tread surface.

10. The pneumatic tire according to claim 1 wherein no sipe is present at the shoulder land.

11. The pneumatic tire according to claim 1, wherein the land ends of the center land extend parallel in the tire circumferential direction.

* * * * *